(12) United States Patent
Steward et al.

(10) Patent No.: US 9,925,971 B2
(45) Date of Patent: Mar. 27, 2018

(54) BRAKE FLUID TEMPERATURE MONITORING

(71) Applicant: JAGUAR LAND ROVER LIMITED, Whitley Coventry Warwickshire (GB)

(72) Inventors: Daren Steward, Evesham (GB); Matthew Wraight, Canterbury (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 15/123,115

(22) PCT Filed: Feb. 18, 2015

(86) PCT No.: PCT/EP2015/053368
§ 371 (c)(1),
(2) Date: Sep. 1, 2016

(87) PCT Pub. No.: WO2015/132070
PCT Pub. Date: Sep. 11, 2015

(65) Prior Publication Data
US 2017/0072932 A1    Mar. 16, 2017

(30) Foreign Application Priority Data
Mar. 3, 2014   (GB) .................................. 1403711.3

(51) Int. Cl.
*G08B 21/00*   (2006.01)
*B60T 17/22*   (2006.01)

(52) U.S. Cl.
CPC ............ *B60T 17/221* (2013.01); *B60T 17/22* (2013.01)

(58) Field of Classification Search
CPC .............................. B60T 17/22; B60T 17/221
USPC ........................................................ 340/449
See application file for complete search history.

(56) References Cited

U.S. PATENT DOCUMENTS

| 5,731,975 | A |   | 3/1998  | Nakashima |             |
|-----------|---|---|---------|-----------|-------------|
| 6,007,165 | A | * | 12/1999 | Sato      | B60T 8/175  |
|           |   |   |         |           | 303/113.2   |
| 6,203,123 | B1| * | 3/2001  | Oyama     | B60T 8/00   |
|           |   |   |         |           | 303/191     |

(Continued)

FOREIGN PATENT DOCUMENTS

| DE | 19654586 A1     | 7/1997 |
| DE | 102005003811 A1 | 8/2006 |
| JP | 2007001497 A    | 1/2007 |

OTHER PUBLICATIONS

Combined Search and Examination Report for application No. GB1403711.3, dated Sep. 19, 2014, 9 pages.

(Continued)

*Primary Examiner* — Mark Rushing
(74) *Attorney, Agent, or Firm* — Reising Ethington P.C.

(57) ABSTRACT

There is provided a system for estimating or monitoring the temperature of brake fluid in a hydraulic brake mechanism, the system comprising a controller configured for: receiving data related to the temperature of a brake friction element of said hydraulic brake mechanism; and estimating the temperature of said brake fluid based upon said data. Aspects of the invention also relate to brake systems and vehicles comprising such systems, to related methods, and to suitable controllers and software.

20 Claims, 5 Drawing Sheets

(56) References Cited

U.S. PATENT DOCUMENTS

| | | | |
|---|---|---|---|
| 2006/0108869 A1* | 5/2006 | Jokic | B60T 8/1755 |
| | | | 303/191 |
| 2007/0194623 A1 | 8/2007 | Miyazaki | |
| 2011/0272230 A1 | 11/2011 | Sekiya et al. | |
| 2013/0297145 A1* | 11/2013 | Shinozaki | B60T 17/22 |
| | | | 701/34.4 |
| 2015/0158471 A1* | 6/2015 | Ezoe | B60T 7/22 |
| | | | 701/70 |

OTHER PUBLICATIONS

International Search Report for International application No. PCT/EP2015/053368, dated May 29, 2015, 5 pages.

Written Opinion for International application No. PCT/EP2015/053368, dated May 29, 2015, 7 pages.

\* cited by examiner

BRAKE FLUID TEMPERATURE MONITORING

TECHNICAL FIELD

This invention relates to the monitoring of brake fluid temperatures. In particular, though not exclusively, this invention relates to systems and methods for in situ monitoring of brake fluid temperature in hydraulic brake mechanisms. Aspects of the invention also relate to vehicles comprising such systems, and to suitable controllers, software and processors.

BACKGROUND

Hydraulic brake mechanisms for vehicles traditionally suffer from the phenomenon of "brake fade", i.e. a loss in braking performance caused by a build-up of heat in braking surfaces. A number of solutions have been proposed over the years to mitigate brake fade.

It is known, for example, to provide slotted, drilled or dimpled brake discs or drums to enhance heat dissipation into the air around the braking system.

The majority of brake discs and drums in road vehicles are currently made from metal, such as iron. To combat brake fade, it is also known to provide brake components, such as brake discs/drums, and/or brake pads/liners, having an enhanced thermal resistance to maintain performance at high temperatures. For example, carbon ceramic brake discs are known to offer substantial benefits in terms of performance, in both wet and dry conditions, in particular in the areas of weight, comfort, thermal stability, corrosion resistance, and durability.

While the performance of brake systems can be improved by mitigating brake fade, particularly by increasing the fade resistance of the brake components, a disadvantage of such mitigation is reduced brake temperature feedback for drivers. In high performance brake systems, e.g. those comprising features to enhance heat dissipation and/or materials offering enhanced thermal resistance, brake fade may be barely perceptible for drivers until extreme amounts of heat have built up in the system. Such extreme amounts of heat may cause the temperature of the hydraulic brake mechanism as a whole to pass a critical point at which a substantial part of the brake fluid vapourises, leading to total brake failure with little warning.

Particularly in the context of road vehicles, it is desirable for brake systems to comprise a warning mechanism for providing failure warnings.

It is an aim of the invention to provide methods and systems that can deliver a failure warning when a hydraulic brake mechanism overheats. It is also an aim of the invention to provide methods and systems for efficient estimation or monitoring of brake fluid temperatures in hydraulic brake mechanisms.

SUMMARY OF THE INVENTION

Some aspects of the invention provide a system for estimating or monitoring the temperature of brake fluid in a hydraulic brake mechanism, the system comprising a suitable controller, for example as described anywhere hereinbelow.

Monitoring of temperature may be achieved by repeated estimation of a temperature during a monitoring time window. Accordingly, where reference is made herein to estimation, this may optionally embrace repeated estimation (i.e. monitoring), for example over a period of at least 1 minute or at least 1 hour. In some embodiments of the invention, the monitoring may comprise repeated estimation in time intervals no greater than 30 seconds (s), for example no greater than 20 s, or no greater than 5 s, or even no greater than 1 s.

According to an aspect of the invention, there is provided a system for estimating or monitoring the temperature of brake fluid in a hydraulic brake mechanism, the system comprising a controller configured for: receiving data related to the temperature of a brake friction element of said hydraulic brake mechanism; and estimating the temperature of said brake fluid based upon said data.

By estimating the temperature of the brake fluid based on data related to the temperature of a brake friction element of the hydraulic brake mechanism, the system can achieve efficient estimation of the brake fluid temperature. Dedicated or further brake fluid detection hardware such as brake fluid temperature sensors may be rendered unnecessary.

The temperature of the brake fluid is estimated by the controller. Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. A suitable set of instructions may be provided which, when executed, cause said control unit or computational device to implement the control techniques specified herein. The set of instructions may suitably be embedded in said one or more electronic processors. Alternatively, the set of instructions may be provided as software to be executed on said computational device. A first controller may be implemented in software run on one or more processors. One or more other controllers may be implemented in software run on one or more processors, optionally the same one or more processors as the first controller. Other suitable arrangements for the controller may also be used.

The controller is configured to receive data related to the temperature of a friction element of said hydraulic brake mechanism. The hydraulic brake mechanism may suitably be for a vehicle, in particular a motor vehicle. In an embodiment, the hydraulic brake mechanism comprises one or more features to enhance heat dissipation and/or brake components, e.g. a friction element, offering enhanced thermal resistance, e.g. as hereinabove described. In an embodiment the friction element comprises a ceramic material.

The term "brake friction element" or "friction element" as used herein embraces brake rotors and brake pads or linings. The term "brake rotor" is used herein to refer to a rotating friction element of a brake. Examples of brake rotors are brake discs or brake drums.

In an embodiment, the friction element comprises a brake rotor. In an embodiment, the friction element comprises a brake disc. As is known in the art, brake discs are a rotating friction element of a disc brake, against which a further friction element, known as the brake pad/lining is applied to supply a braking effort.

Optionally, the controller may be configured for receiving data related to the temperature of a plurality of friction elements (e.g. brake discs) of said hydraulic brake mechanism. In an embodiment, the controller may be configured to receive data related to the temperature of a friction element in each one of a plurality of brakes, e.g. disc brakes, of the hydraulic brake mechanism. In this manner, critical temperatures can be determined in all parts of the hydraulic brake mechanism. Wherever reference is made herein to data related to a brake friction element, it is optionally contemplated that the data may be related to a plurality of brake friction elements, for example all brake rotors and/or brake pads or linings of the hydraulic brake mechanism. Data from a plurality of friction elements may optionally be processed by the controller into suitably representative data related to a friction element, for example by selecting the data indicating the highest or most relevant friction element temperature.

The data received by the controller may in principle be of any type providing information about the temperature of a brake friction element. In an embodiment of the invention, the controller is configured for receiving data comprising a pre-estimated temperature signal. Alternatively, the controller may be configured to estimate the temperature of the brake friction element based on data received from one or more sensors configured for sensing data related to the temperature of the brake friction element, and to estimate the temperature of the brake fluid based upon the estimated temperature of the brake friction element. Optionally, the data received by the controller may thus comprise a temperature value associated with a brake friction element, or be converted by the controller into a temperature value associated with a brake friction element.

A pre-estimated signal may be obtained from sensed data by applying calculations known in the art for estimating the temperature of the brake friction element. Where the controller is configured to estimate the temperature of the brake friction element based on data received from one or more sensors, this may also be on the basis of such known calculations.

Examples of sensed data that may be used in such known calculations are the speed of rotation of a brake rotor, activation of the hydraulic brake mechanism over time, and optionally (for enhanced accuracy), brake pressure applied by the hydraulic brake mechanism over time. Alternatively, the temperature of the brake friction element may be measured directly to provide the data, though this is likely to be inconvenient in most applications.

The controller is configured to estimate a temperature value for the brake fluid based on said data related to the temperature of a brake friction element. As aforesaid, this may be achieved by a set of instructions, or routine, provided to the controller in any suitable fashion. In an embodiment, the controller is configured to estimate the temperature of the brake fluid by solving an equation or sequence of equations, e.g. one or more of the equations shown in the accompanying Figures.

In an embodiment, the controller may be configured for estimating the temperature of the brake fluid based on a previously estimated temperature of the brake fluid and/or a previous temperature of the brake friction element derivable from data received by the controller.

In an embodiment, the controller is configured to estimate the temperature of the brake fluid by a routine comprising: storing a previously estimated temperature of the brake fluid, estimating a change relative to said previously estimated temperature based on said data related to the temperature of a brake friction element, and calculating an estimated temperature of the brake fluid by applying the estimated change to the previously estimated temperature.

For particular accuracy, the controller may be configured for scaling a previously estimated temperature by an amount varying in dependence on said data related to the temperature of a brake friction element to provide a scaled previously estimated temperature and calculating the estimated temperature using said scaled previously estimated temperature. In an embodiment, the controller may be configured for calculating said change in temperature by a routine comprising using an expression equivalent to an area of graph between a scaled previously estimated temperature associated with a previous point in time; a temperature value of a brake friction element at said previous point in time; and a current temperature value of the brake friction element.

In an embodiment, the controller may be configured for estimating the temperature of the brake fluid based on a temperature profile over time of said brake friction element, the profile being derivable from said data received by the controller. Optionally, said profile over time may be associated with a time-step from/since an immediately preceding estimation of brake fluid temperature.

In an embodiment, the controller may be configured for estimating the temperature of the brake fluid based on a difference in temperature between a stored, previously estimated temperature of the brake fluid, and a temperature (and/or temperature profile over time) of said brake friction element derivable from said data received by the controller.

The system may be configured to estimate the temperature of said brake fluid based upon ambient temperature. In an embodiment, the controller is configured for estimating a temperature of said brake fluid that is no lower than ambient temperature. Suitably, the controller may be configured for comparing an estimated temperature of said brake fluid with ambient temperature, and for estimating the temperature of said brake fluid to be at ambient if the estimated temperature is less than or equal to ambient.

The system may optionally be configured for providing a warning output when the estimated temperature exceeds a set threshold. In an embodiment, the system comprises a warning component, for example a warning light array installed in a driver console of a vehicle, configured to receive and execute commands from the controller, the controller being configured to command the warning component to emit a warning signal if the estimated temperature of the brake fluid exceeds a set threshold. In an embodiment, the controller is conjured for limiting the maximum power output of a vehicle comprising the hydraulic brake mechanism if the estimated temperature of the brake fluid exceeds a set threshold.

As aforesaid, the system may optionally be configured for monitoring the temperature of the brake fluid over time. To this end, the controller may advantageously be configured with one or more repeatable routines for estimating the temperature of the brake fluid repeatedly.

In an embodiment the controller is configured by an initialise routine and/or a main routine. In an embodiment, the initialise routine may be executed by the controller on start-up of the system, which may be linked to the start-up of the controller and/or hydraulic brake mechanism, with the main routine being executed thereafter. Such start-up may also be equated to the start-up of one or more host systems, such as for example a vehicle. In an embodiment, the controller is configured for repeating the main routine as long as a vehicle ignition switch remains on and/or the controller remains active.

In an embodiment, the controller is configured by (with) a main routine. In an embodiment, the main routine comprises determining whether the time since last run of the main routine or an initialise routine exceeds a set time-step, and executing one or more subsequent steps of the main routine only once the time since last run of the main routine exceeds the time-step. In an embodiment, the main routine comprises estimating said temperature of said brake fluid based on said data; and causing a warning component of the system to emit a warning signal if the estimated temperature of the brake fluid exceeds a set threshold. In an embodiment, the main routine comprises storing said estimated temperature and/or received data related to the temperature of a brake friction element for a period of time for future reference.

In an embodiment the controller is configured by (with) an initialise routine. In an embodiment, the initialise routine comprises determining whether the time since the hydraulic brake mechanism or controller was last active is less than a set time delay, e.g. without limitation, at least 30 seconds, or at least 1 minute. In an embodiment, the initialise routine comprises determining the time since the hydraulic brake mechanism or controller was last active, and executing one or more subsequent steps of the initialise routine only if the time since the hydraulic brake mechanism or controller was last active is not less than a set time delay. Advantageously, the controller may be configured to estimate the temperature of said brake fluid as ambient if the time since the hydraulic brake mechanism or controller was last active is greater than a time limit. In an embodiment, the initialise routine comprises determining whether the temperature of brake fluid was rising immediately before the hydraulic brake mechanism or controller last became inactive and, if said temperature was rising, to incorporate an increase factor in estimating the temperature of said brake fluid. In an embodiment, the increase factor may be determined in dependence upon a rate of change of temperature of said brake fluid before the hydraulic brake mechanism or controller last became inactive. In an embodiment, the initialise routine comprises estimating the temperature of said brake fluid based on a previous estimate and a cooldown function. In an embodiment, the initialise routine comprises a comparison with ambient temperature to ensure that the estimated temperature of said brake fluid is no lower than ambient temperature.

The controller may optionally perform other known control functions within the vehicle. Alternatively, the controller may be a dedicated controller not performing any other functions.

According to another aspect of the invention there is provided a brake system comprising a hydraulic brake mechanism and a system, as defined or described anywhere herein, for estimating or monitoring the temperature of brake fluid of the brake mechanism. Yet another aspect of the invention provides a vehicle comprising such a brake system.

According to still another aspect of the invention there is provided a vehicle comprising a system for estimating or monitoring the temperature of brake fluid of a hydraulic brake mechanism of the vehicle, the system being as defined or described anywhere herein.

The vehicle may in particular be a motor vehicle, such as a motor car.

Some aspects of the invention provide a method of estimating or monitoring the temperature of brake fluid in hydraulic brake mechanisms.

A still further aspect of the invention provides a method of estimating or monitoring the temperature of brake fluid in a hydraulic brake mechanism, the method comprising: estimating the temperature of said brake fluid based upon data related to the temperature of a brake friction element of said hydraulic brake mechanism.

In an embodiment said data relates to the temperature of a brake friction element in each one of a plurality of brakes of the hydraulic brake mechanism.

In an embodiment the method comprises estimating the temperature of the brake friction element based on data related to the temperature of the friction element, and estimating the temperature of the brake fluid based upon the estimated temperature of the brake friction element.

In an embodiment, the method comprises estimating the temperature of the brake fluid by: storing a previously estimated temperature of the brake fluid; estimating a change relative to said previously estimated temperature based on said data related to the temperature of a brake friction element; and calculating an estimated temperature of the brake fluid by applying the estimated change to the previously estimated temperature. Optionally, the method comprises scaling a previously estimated brake fluid temperature by an amount varying in dependence on said data related to the temperature of a brake friction element to provide a scaled previously estimated temperature, and calculating the estimated temperature of the brake fluid using the scaled previously estimated temperature. Suitably, the method comprises calculating said change in temperature using an expression equivalent to an area of graph between: a scaled previously estimated temperature associated with a previous point in time; a temperature value of a brake friction element at said previous point in time; and a current temperature value of the brake friction element.

In an embodiment the method comprises estimating the temperature of the brake fluid based on a temperature profile of said brake friction element over time, the profile over time being derivable from said data. In an embodiment said profile is associated with a time-step since an immediately preceding estimation of brake fluid temperature.

In an embodiment the method comprises estimating the temperature of the brake fluid based on: a difference in temperature between a stored, previously estimated temperature of the brake fluid, and a temperature or temperature profile of a brake friction element derivable from said data.

In an embodiment the method comprises emitting a warning signal if the estimated temperature of the brake fluid exceeds a set threshold. In an embodiment, the method comprises limiting the maximum power output of a vehicle comprising the hydraulic brake mechanism if the estimated temperature of the brake fluid exceeds a set threshold.

In an embodiment the method comprises storing an estimated temperature and/or said data for a period of time.

In an embodiment the method comprises determining, on start-up of the controller or vehicle, whether the temperature of the brake fluid was rising immediately before the controller or vehicle last became inactive and, if said temperature was rising, to incorporate an increase factor in estimating the temperature of said brake fluid.

In an embodiment the method comprises estimating the temperature of said brake fluid based on a previous estimate of the temperature and a cool down function.

Other optional features of the method may comprise performing any of the functionality described hereinabove in respect of the controller and/or other components of the system.

The method may be computer implemented. A further aspect of the invention embraces a carrier medium carrying computer readable code for controlling a vehicle or vehicle sub-system to carry out the method. Yet another aspect of the invention provides a computer program executable on a processor so as to implement the method. Still another aspect of the invention provides a computer readable medium loaded with such a computer program. The invention also embraces, from a still further aspect, a processor arranged to implement the method or the computer program.

Throughout the description and claims of this specification, the words "comprise" and "contain" and variations of the words, for example "comprising" and "comprises", mean "including but not limited to", and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
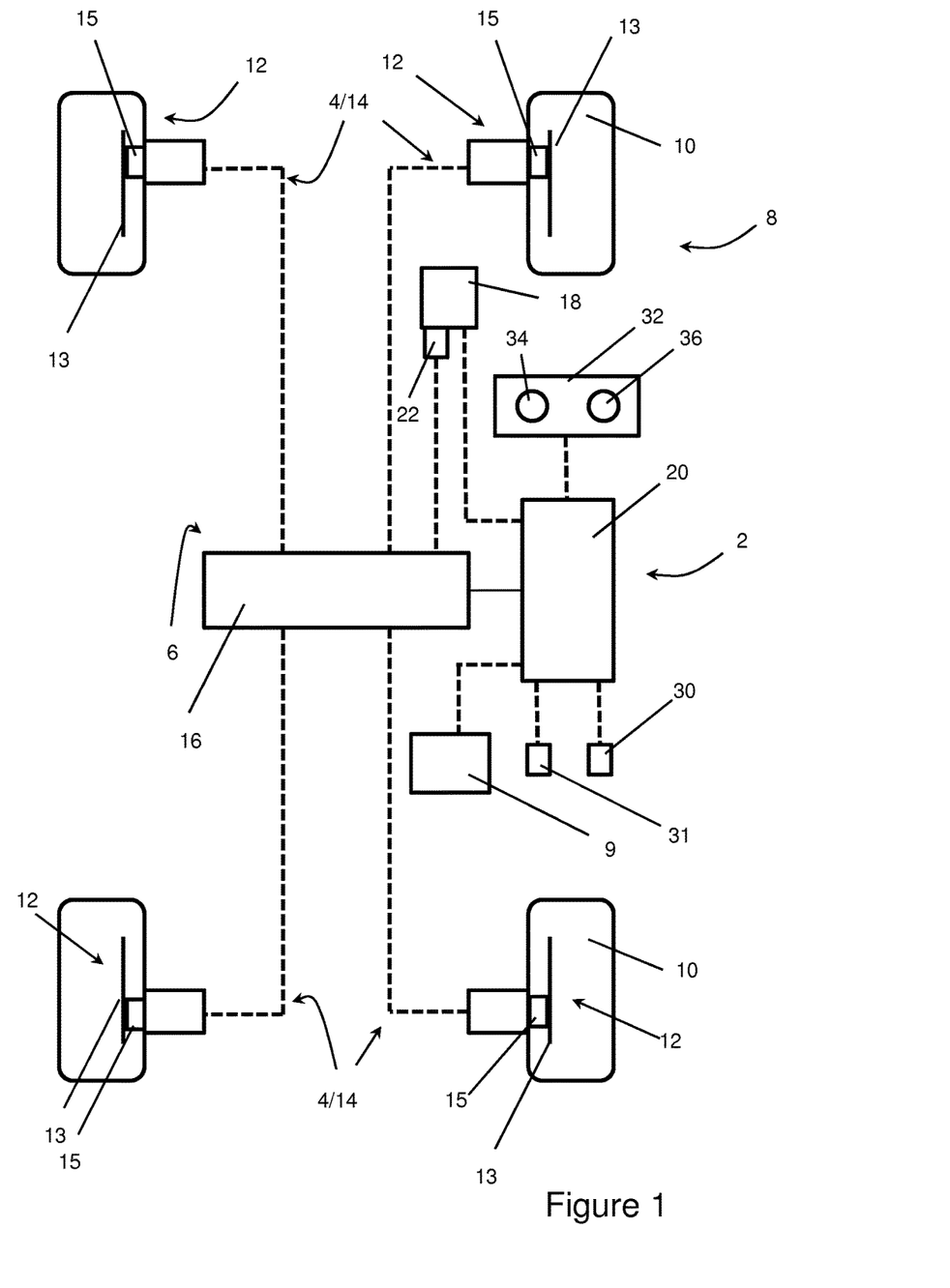
FIG. 1 is a schematic view of a vehicle comprising a system for monitoring the temperature of brake fluid in a hydraulic brake mechanism, according to an embodiment of the invention.

Referring firstly to FIG. 1, in an embodiment of the invention, there is provided a system 2 for monitoring the temperature of brake fluid 4 in a hydraulic brake mechanism 6 of a motor vehicle 8.

The motor vehicle 8 comprises an engine with an ignition switch 9, and four wheels 10 each co-operable with a disc brake 12 of the hydraulic brake mechanism 6. Each brake 12 comprises friction elements in the form of a brake disc 13 (brake rotor), and a brake pad/lining 15 for engaging the brake disc 13 on actuation of the brake 12 by brake fluid 4 to supply a braking effort. The hydraulic brake mechanism 6 comprises brake fluid lines 14 establishing fluid connections between each of the brakes 12 and a hydraulic control unit 16. The hydraulic control unit 16 is configured for supplying pressurised brake fluid 4 to the brake lines 14 to allow actuation of the disc brakes 12 to supply a braking effort to one or more of the wheels 10 as desired.

The hydraulic control unit 16 is co-operable with a brake pedal 18 and a controller 20 to control the supply braking effort. The controller 20 comprises a control unit or computational device having one or more electronic processors, and is configured with instructions, embedded or in software, to perform desired functions as will be described. In some variants of the embodiment, the hydraulic control unit 16 may be in fluid communication with a master cylinder 22 associated with the brake pedal 18. Additionally or alternatively, the hydraulic control unit 16 may be operated in a decoupled or "brake-by-wire" mode based on commands received from the controller 20, which is in turn connected with the brake pedal 18 and may be configured to receive driver commands from the brake pedal 18, e.g. via a brake pedal simulator (not shown).

The controller 20 forms part of the system 2 for monitoring the temperature of the brake fluid 4. In particular, the controller 20 is configured for receiving data related to the temperature of the brake discs 13 of the hydraulic brake mechanism 6, and for estimating a brake fluid temperature value for the brake fluid 4 based upon the received data.

In this embodiment the data related to the temperature of the brake discs 13 is received by the controller 20 from the brake pedal 18 and a vehicle speed sensor 30. In particular, the controller 20 is configured with a conventional mathematical model for calculating the temperature of each of the brake discs 13 based on a braking input signal received from the brake pedal 18, a vehicle speed signal received from the speed sensor 30, and pre-set material properties of the brake discs 13 and brake mechanism 6 as a whole. Additionally or alternatively, the received data related to the temperature of the brake discs 13 may be a pre-calculated or measured temperature signal.

The controller 20 is configured for calculating a brake fluid temperature value based upon the data received in respect of the four brake discs 13. In particular, the controller 20 is configured to calculate a brake fluid temperature value based upon the highest brake disc temperature derived from the data received but also taking into account an ambient temperature reading received from a thermometer 31. The controller 20 is configured to store the received data for a set period of time and to keep a time log. Furthermore, the controller 20 is configured to control a warning light array 32 comprising amber and red warning lights 34, 36, as will be described.

To monitor the temperature of the brake fluid, the controller 20 is configured/programmed with an Initialise Routine and a Main Routine, which will now be described with reference to FIGS. 2 to 4, in which the following nomenclature is used (Table 1):

| Symbol | Units | Description |
|---|---|---|
| $T_d$ | °C. | Disc temp from conventional mathematical model (current) |
| $T_{d0}$ | °C. | Disc temp from conventional mathematical model (at last time-step) |
| $T_f$ | °C. | Estimated brake fluid temperature (current, scaled by SF) |
| $T_{f0}$ | °C. | Estimated brake fluid temperature (at last time-step, scaled by SF) |
| t | s | Variable to store Global Time |
| $t_s$ | s | Time-step between calculations |
| $c_f$ | | Constant (Intercept of Factor against Td) |
| $m_f$ | | Constant (Gradient of Factor against Td) |
| $c_a$ | | Constant (Intercept of Td to Tf area against ΔTf) |
| $m_a$ | | Constant (Gradient of Td to Tf area against ΔTf) |
| $m_c$ | | Constant (Gradient of 100*Tf against time (static cooling)) |
| $T_j$ | °C. | Fluid temperature jump @ engine off |
| $T_l$ | °C. | Lower temperature limit (turning off amber light) |
| $T_m$ | °C. | Mid temp temperature (turning on amber light & off red light) |
| $T_u$ | °C. | Upper temperature limit (turning on red light) |
| SF | °C. | Scaling Factor (to increase accuracy) |
| $T_a$ | °C. | Ambient temperature |
| $t_d$ | s | Time delay used for initialise function |
| $t_{d2}$ | s | Time limit used for initialise function |

Figure 2:
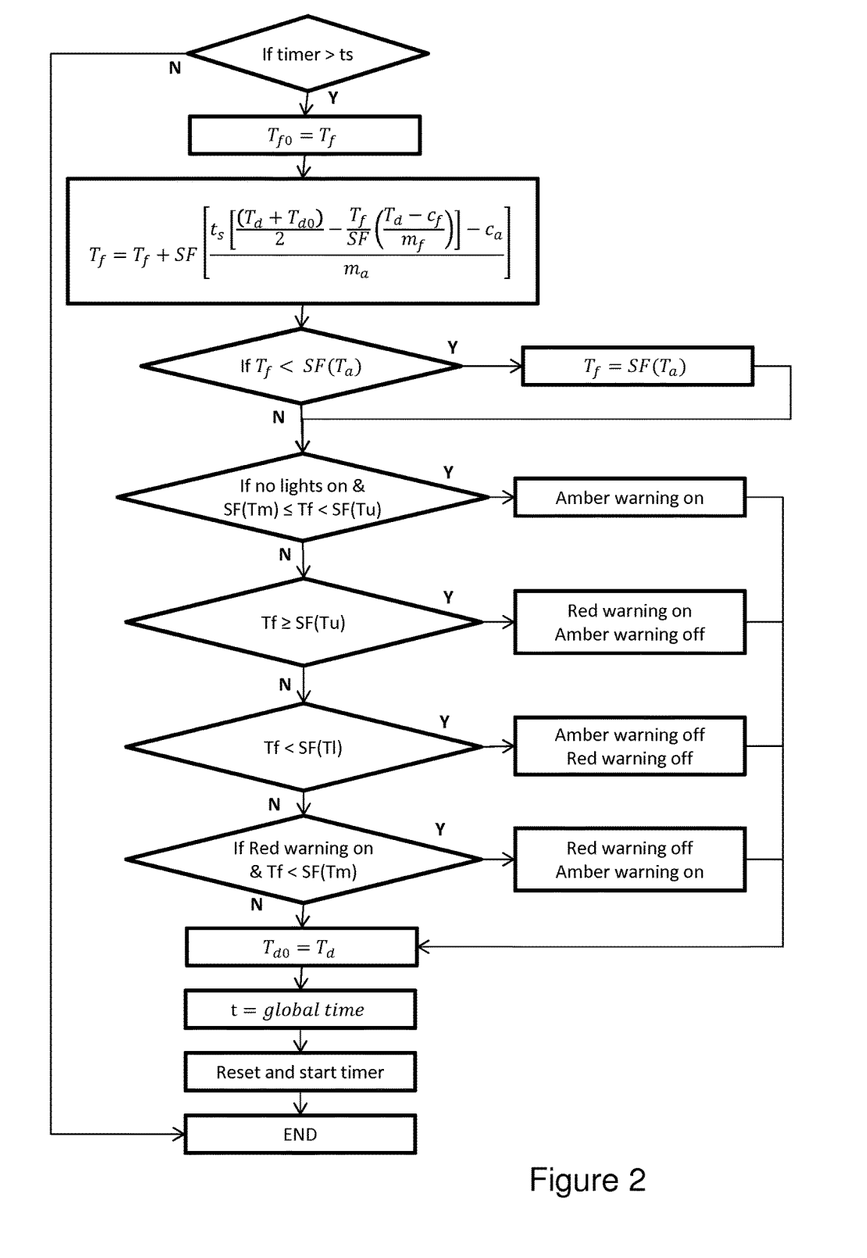
FIG. 2 is a flow-chart summarizing the operation of a Main Routine of the system of FIG. 1.

With reference to FIG. 2, while the engine switch 9 is turned on, the hydraulic brake mechanism is assumed to be active and the controller 20 follows the Main Routine.

In a first step of the Main Routine, the controller 20 determines whether a timer since the last run of the Main Routine or the Initialise Routine exceeds a set time-step ($t_s$), set for example to 10 seconds. If the timer does not exceed the time-step ($t_s$) then the controller 20 ends and restarts the Main Routine. When the timer does exceed the time-step ($t_s$), the controller 20 proceeds to step two of the Main Routine.

In step two of the Main Routine, the controller 20 sets the value for the brake fluid temperature determined for the last time-step ($Tf_0$), to the current brake fluid temperature, i.e. as last determined during the previous run of the Main Routine ($T_f$):

$$T_{f0} = T_f$$

Thereafter the controller 20 proceeds to step three of the Main Routine.

In step three, the controller 20 recalculates the brake fluid temperature ($T_f$) based on the fluid temperature at the previous time-step ($Tf_0$), the brake disc temperature at the previous time-step ($Td_0$) obtained from the conventional model, the current brake disc temperature ($T_d$) obtained from the conventional model, and a number of constants ($c_f$, $m_f$, $c_a$, $m_a$, $m_c$), with a scaling factor (SF) applied to enhance accuracy.

Figure 3:
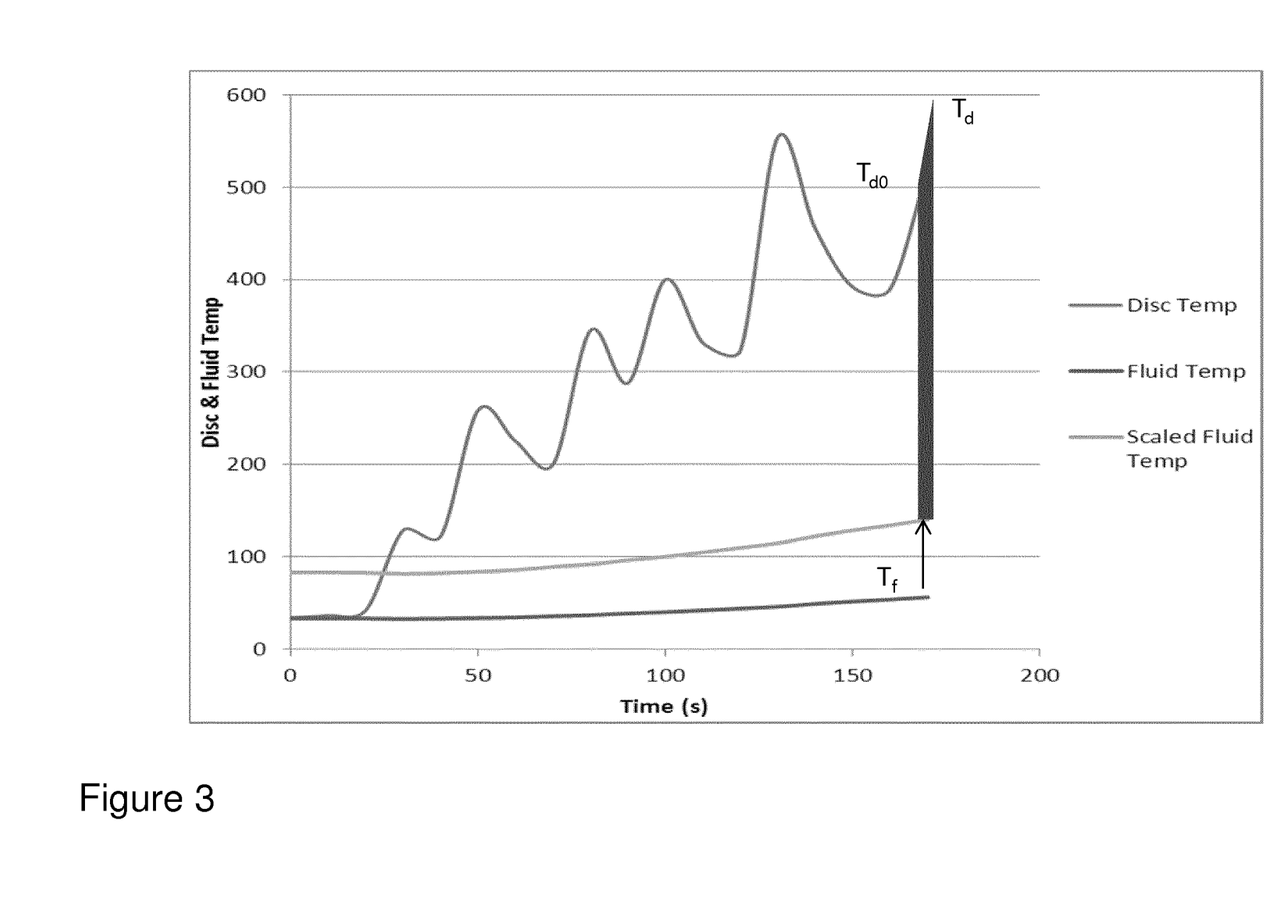
FIG. 3 is a graph plotting illustrative values for an estimated brake disc temperature, an estimated brake fluid temperature and a scaled estimated brake fluid temperature, obtained from the system of FIG. 1.
Figure 4:
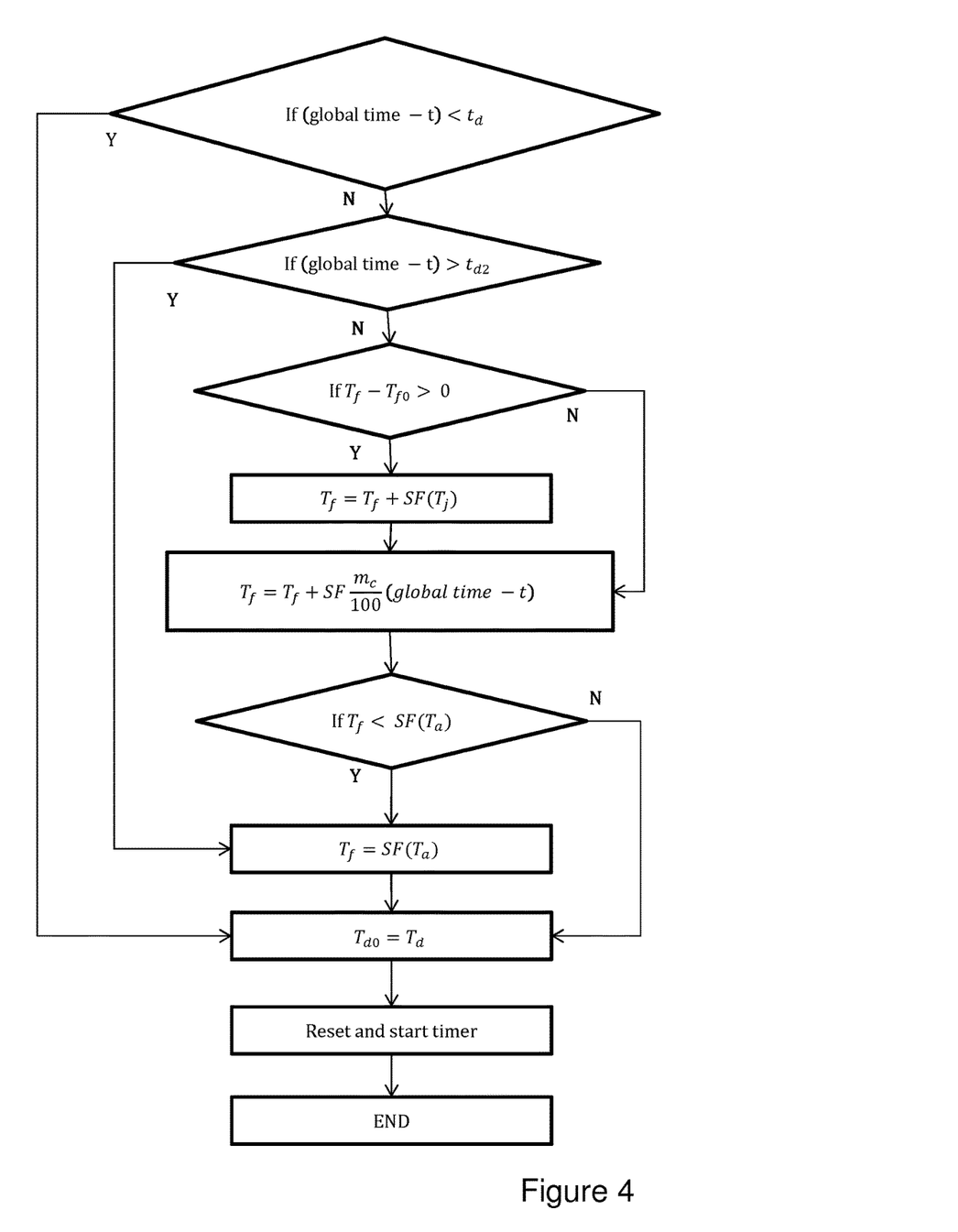
FIG. 4 is a flow-chart summarizing the operation of an Initialise Routine of the system of FIG. 1.

By way of further explanation, and referring additionally to FIG. 3, within the equation used in this step, the "current" brake fluid temperature as last generated by the Main Routine ($T_f$) is scaled by an amount which varies with brake disc temperature and is calculated using $c_f$, mf and $T_d$:

$$\frac{T_f}{SF}\left(\frac{T_d - c_f}{m_f}\right)$$

The area of graph made between this scaled point and the average between the current ($T_d$) and previous ($Td_0$) brake disc temperatures over the period of the time-step ($t_s$) is then calculated (see shading in FIG. 3), whereupon the change in brake fluid temperature since the last time-step is calculated using said area and the constants $c_a$ and $m_a$:

$$SF\left[\frac{t_s\left[\frac{T_d + T_{d0}}{2} - \frac{T_f}{SF}\left(\frac{T_d - c_f}{m_f}\right)\right] - c_a}{m_a}\right]$$

The calculated change in brake fluid temperature is thus based on a profile of brake disc temperature over time, in particular, the average of previous and current brake disc temperature. It can also be said to be based on the difference between the estimated brake fluid temperature as last generated by the Main Routine and current brake disc temperature.

The calculated change in brake fluid temperature is then added to the "current" brake fluid temperature as last generated by the Main Routine ($T_f$) to recalculate the current brake fluid temperature ($T_f$ on left of the equation):

$$T_f = T_f + SF\left[\frac{t_s\left[\frac{T_d + T_{d0}}{2} - \frac{T_f}{SF}\left(\frac{T_d - c_f}{m_f}\right)\right] - c_a}{m_a}\right]$$

Thereafter the controller 20 proceeds to step four of the Main Routine.

Referring again to FIG. 2, in step four, the controller 20 compares the recalculated current brake fluid temperature ($T_f$) obtained from step three to the ambient temperature ($T_a$) received from the thermometer 31. If the recalculated current brake fluid temperature ($T_f$) is below the ambient temperature then the current brake fluid temperature ($T_f$) is set to the ambient temperature ($T_a$). If the recalculated current brake fluid temperature ($T_f$) is above the ambient temperature then the (recalculated) current brake fluid temperature ($T_f$) is left unaltered. Thereafter the controller 20 proceeds to steps five to eight of the Main Routine.

In steps five to eight, the controller 20 compares the current brake fluid temperature ($T_f$) obtained from step four with lower, middle and upper temperature limits ($T_l$, $T_m$, $T_u$) to determine a signal to be sent by the controller 20 to the warning light array 32. Again, a scaling factor is applied to enhance accuracy. Steps five to eight may be summarized as follows:

If the brake fluid temperature rises to between the middle and upper temperature limits ($T_m$, $T_u$) then the controller sends a signal for the amber warning light 34 to be turned on in the array 32.

If the brake fluid temperature rises to above the upper temperature limit ($T_a$) then the controller sends a signal for the red warning light 36 to be turned on in the array 32 and for the amber warning light 34 to remain off.

If the brake fluid temperature drops to between the middle and upper temperature limits ($T_m$, $T_u$) then the controller sends a signal for the red light 36 to be turned off and the amber light 34 to be turned on in the array 32.

If the brake fluid temperature drops to below the lower limit ($T_l$) then the controller sends a signal for the red and amber lights 34, 36 to be turned off in the array 32.

Whenever the red light is on, the controller also limits the maximum power output of the vehicle's engine. After steps five to eight, the controller 20 proceeds to step nine, in which the value for the brake disc temperature at previous time-step ($T_{d0}$) is set to the current brake disc temperature ($T_d$) in readiness for the next routine.

After step nine, the controller 20 proceeds to step ten of the Main Routine, in which the variable t is set to global time. In subsequent step eleven, the Main Routine is reset and the timer started, after which the Main Routine is ended.

The Main Routine is immediately re-run if the engine switch 9 remains on, proceeding again to step 2 thereof after the set time-step ($t_s$) as hereinabove described. If the engine switch 9 is switched off, the controller 20 stops running the Main Routine.

If the engine switch 9 is turned from off to on, the controller 20 runs the Initialise Routine and then the Main Routine, as will now be described with reference to FIG. 4.

In a first step of the Initialise Routine, the controller 20 determines whether the time since the engine switch 9 was last on is less than a set time delay ($t_d$), for example one minute, by making use of the variable t set during the last run of the Main Routine. If the time since the engine switch 9 was on is less than the set time delay ($t_d$) then the controller 20 simply proceeds to set the value for the brake disc temperature at previous time-step ($T_{d0}$) to the current brake disc temperature ($T_d$) in readiness for running the Main Routine, i.e. proceeds to step seven of the Initialise Routine, further described below. If the time since the engine switch 9 was on is more than the set time delay ($t_d$) then the controller checks whether the time since the engine switch 9 was last on is more than a set time limit ($t_{d2}$), proceeding to estimate the temperature as ambient (see step six) if it is, and otherwise proceeds to step two of the Initialise Routine.

In step two of the Initialise Routine, the controller 20 determines whether the temperature of the brake fluid 4 was rising immediately before the engine switch 9 was turned off. To do so, the controller accesses the values for current estimated brake fluid temperature (Tf) and estimated brake fluid temperature at last time step ($T_{f0}$), as last generated by the Main Routine. If said current estimated brake fluid temperature ($T_f$) is greater than said estimated brake fluid temperature at last time step (TO then the controller proceeds to step three of the Initialise Routine, in which the current estimated brake fluid temperature ($T_f$) is recalculated by adding a pre-set amount ($T_j$) to reflect brake fluid heating after engine switch off:

$$T_f = T_f + SF(T_j)$$

The pre-set amount ($T_j$) is read by the controller 20 from a lookup table, which maps a plurality of pre-set amounts against various profiles for rates of change of temperature of the brake fluid 4 immediately before engine switch off.

Thereafter, or without such adjustment if the brake fluid temperature was not found to be rising before engine switch off, the controller 20 proceeds to step four of the Initialise Routine, in which the current estimated brake fluid temperature ($T_f$) is recalculated based on an assumed linear cool down while the engine switch was turned off:

$$T_f = T_f / SF_{100}{}^{me}(\text{global time } t)$$

The current estimated brake fluid temperature ($T_f$) obtained in step four is checked by the controller 20 in step five against ambient temperature ($T_a$) obtained from the thermometer 31, and adjusted if necessary in step six. Specifically, if the temperature obtained from step four is found to be lower than ambient temperature ($T_a$), then the current estimated brake fluid temperature ($T_f$) is set to the ambient temperature in step six. Otherwise, the temperature obtained from step four is retained.

In subsequent step seven, the controller 20 sets the value for the brake disc temperature at previous time-step ($T_{d0}$) to the current brake disc temperature ($T_d$) in readiness for running the Main Routine. In subsequent step eight, the Initialise Routine is reset and the timer started, after which the Initialise Routine is ended. Provided that the engine switch 9 remains on, the Main Routine is then commenced and continued until the engine switch 9 is turned off.

With the combination of the Initialise Routine and the Main Routine, the system 2 of this embodiment delivers efficient and effective monitoring of brake fluid temperatures. Advantageously, the system 2 does not require additional sensing hardware (e.g. gas pressure sensors for brake fluid) and is able to make use of available data to provide accurate estimates of brake fluid temperatures. By turning on warning lights in the array 32, the system 2 can provide reliable failure warnings. Such failure warnings can be implemented in any hydraulic brake system comprising a friction element for which data related to temperature is available, including in sporting brake systems where brake fade is mitigated.

The constants used in the Main Routine and Initialise Routine depend on the particular configuration of the brake system and can be determined by those skilled in the art by calibration and calculation. In particular, the constants are determined empirically by collecting actual measured fluid temperature from testing and optimising the constants to minimise the error between actual and estimated fluid temperatures.

The Fluid temperature initial value ($T_f$ and $T_{f0}$) is set to ambient for first start up.

It will be appreciated that many modifications can be made to the system 2 without departing from the scope of the invention as defined in the appended claims. For example, the array 32 could be replaced with any other suitable driver alert (e.g. visual, tactile, audible), or left out entirely if no warning of brake fluid temperature is desired, for example because monitoring is required for other reasons. Furthermore, the temperature of the brake fluid could be determined from the temperature of another friction element, e.g. a brake pad 15 instead of a brake disc 13.

Figure 5:
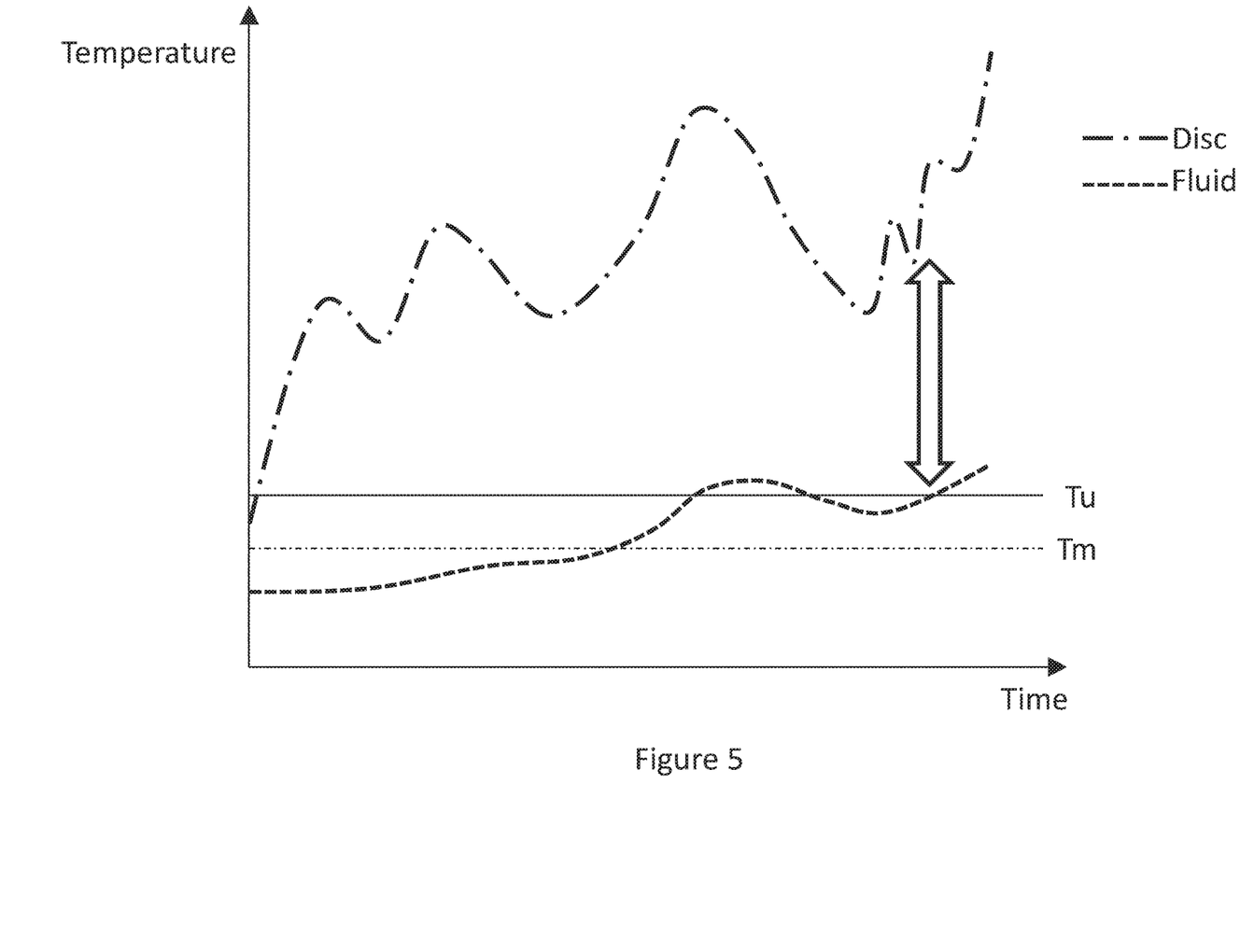
FIG. 5 is a graph plotting further illustrative values for an estimated brake disc temperature, and an estimated brake fluid temperature, obtained from the system of FIG. 1.

The functioning of the system 2 illustrates a method of estimating or monitoring the temperature of brake fluid in a hydraulic brake mechanism by estimating the temperature of the brake fluid based upon data related to the temperature of a brake friction element of the hydraulic brake mechanism. With reference to FIG. 5, this method has been shown to be highly effective in estimating brake fluid temperatures both in conditions of rising brake fluid temperature and in conditions of falling brake fluid temperature.

For economy, the controller 20 performing the described temperature monitoring functions in this embodiment, also functions as a brake controller. The controller 20 could be further programmed to perform other known control functions within the vehicle. Alternatively, a dedicated controller, not performing any other functions at all, could be used for the brake fluid temperature monitoring system 2. The controller may thus be implemented as a shared controller of the vehicle or as a dedicated controller. As aforesaid, the controller 20 in the above-described embodiment comprises a control unit or computational device having one or more electronic processors. The controller may comprise a single control unit or electronic controller or alternatively different functions of the controller may be embodied in, or hosted in, different control units or controllers.

The invention claimed is:

1. A system for estimating or monitoring the temperature of brake fluid in a hydraulic brake mechanism, the system comprising a controller configured for: receiving data related to the temperature of a brake friction element of said hydraulic brake mechanism; and estimating the temperature of said brake fluid based upon said data, wherein the controller is configured for estimating the temperature of the brake fluid based on a temperature profile over time of said brake friction element, the profile being derivable from said data received by the controller.

2. The system of claim 1, wherein the controller is configured to receive data related to the temperature of a brake friction element in each one of a plurality of brakes of the hydraulic brake mechanism.

3. The system of claim 1, wherein the controller is configured to estimate the temperature of the brake friction element based on data received from one or more sensors configured for sensing data related to the temperature of the brake friction element, and to estimate the temperature of the brake fluid based upon the estimated temperature of the brake friction element.

4. The system of claim 1, wherein the controller is configured to estimate the temperature of the brake fluid by a routine comprising: storing a previously estimated temperature of the brake fluid, estimating a change relative to said previously estimated temperature based on said data related to the temperature of a brake friction element, and calculating an estimated temperature of the brake fluid by applying the estimated change to the previously estimated temperature.

5. The system of claim 4, wherein said routine comprises scaling a previously estimated temperature of the brake fluid by an amount varying in dependence on said data related to the temperature of a brake friction element to provide a scaled previously estimated temperature of the brake fluid, and calculating the estimated temperature of the brake fluid using the scaled previously estimated temperature of the brake fluid.

6. The system of claim 5 wherein said routine comprises calculating said change relative to said previously estimated temperature of the brake fluid using an expression equivalent to an area of a temperature versus time graph between: a scaled previously estimated temperature associated with a previous point in time; a temperature value of a brake friction element at said previous point in time; and a current temperature value of the brake friction element.

7. The system of claim 1, wherein temperature profile is associated with a time-step between estimations.

8. The system of claim 1 comprising a warning component, wherein the controller is configured to cause the warning component to emit a warning signal if the estimated temperature of the brake fluid exceeds a set threshold.

9. The system of claim 1, wherein the controller is configured by initialize routine to determine whether the temperature of the brake fluid was rising immediately before the controller last became inactive and, if said temperature was rising, to incorporate an increase factor in estimating the temperature of said brake fluid.

10. The system of claim 1, wherein the controller is configured by an initialize routine to estimate the temperature of said brake fluid based on a previous estimate and a cool down function.

11. A brake system comprising a hydraulic brake mechanism and system for estimating or monitoring the temperature of brake fluid in the hydraulic brake mechanism, the system comprising a controller configured for: receiving data related to the temperature of a brake friction element of said hydraulic brake mechanism; and estimating the temperature of said brake fluid based upon said data, wherein the controller is configured for estimating the temperature of the brake fluid based on a temperature profile over time of said brake friction element, the profile being derivable from said data received by the controller.

12. A vehicle comprising a brake system, the brake system comprising a hydraulic brake mechanism and system for estimating or monitoring the temperature of brake fluid in the hydraulic brake mechanism, the system comprising a controller configured for: receiving data related to the temperature of a brake friction element of said hydraulic brake mechanism; and estimating the temperature of said brake fluid based upon said data, wherein the controller is configured for estimating the temperature of the brake fluid based on a temperature profile over time of said brake friction element, the profile being derivable from said data received by the controller.

13. A method of estimating or monitoring the temperature of brake fluid in a hydraulic brake mechanism, the method comprising: estimating the temperature of said brake fluid based upon data related to the temperature of a brake friction element of said hydraulic brake mechanism, the method further comprising estimating the temperature of the brake fluid based on a temperature profile over time of said brake friction element, the profile being derivable from said data.

14. The method of claim 13, wherein said data relates to the temperature of a brake friction element in each one of a plurality of brakes of the hydraulic brake mechanism.

15. The method of claim 13, comprising estimating the temperature of the brake friction element based on data related to the temperature of the brake friction element, and estimating the temperature of the brake fluid based upon the estimated temperature of the brake friction element.

16. The method of claim 13 comprising estimating the temperature of the brake fluid by: storing a previously estimated temperature of the brake fluid; estimating a change relative to said previously estimated temperature based on said data related to the temperature of a brake friction element; and calculating an estimated temperature of the brake fluid by applying the estimated change to the previously estimated temperature.

17. The method of claim 16 comprising scaling a previously estimated temperature of the brake fluid by an amount varying in dependence on said data related to the temperature of a brake friction element to provide a scaled previously estimated temperature of the brake fluid, and calculating an estimated temperature of the brake fluid using the scaled previously estimated temperature of the brake fluid.

18. The method of claim 17 comprising calculating said change relative to said previously estimated temperature of the brake fluid using an expression equivalent to an area of a temperature versus time graph between: a scaled previously estimated temperature associated with a previous point in time; a temperature value of a brake friction element at said previous point in time; and a current temperature value of the brake friction element.

19. The method of claim 13, wherein said temperature profile is associated with a time-step since an immediately preceding estimation.

20. The method of claim 13 comprising emitting a warning signal if the estimated temperature of the brake fluid exceeds a set threshold.

* * * * *